US012069054B2

(12) United States Patent
Monroe, II et al.

(10) Patent No.: US 12,069,054 B2
(45) Date of Patent: Aug. 20, 2024

(54) CONVERTING PRIVATE CHANNELS TO PUBLIC CHANNELS

(71) Applicant: Saleforce, Inc., San Francisco, CA (US)

(72) Inventors: Bradford Parker Monroe, II, Washington, DC (US); Ittai Sean Barzilay, San Francisco, CA (US); Michael Demmer, San Francisco, CA (US); Elizabeth Clemenson, San Francisco, CA (US); Christopher Sullivan, Wellesley, MA (US); Ryan Greenberg, Montclair, NJ (US); Sivapriyan Sivakumaran, San Francisco, CA (US); Andrew S. Morrison, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 207 days.

(21) Appl. No.: 17/452,016

(22) Filed: Oct. 22, 2021

(65) Prior Publication Data

US 2023/0127356 A1    Apr. 27, 2023

(51) Int. Cl.
*H04L 29/06* (2006.01)
*G06F 21/62* (2013.01)
*H04L 9/40* (2022.01)
*H04L 41/22* (2022.01)

(52) U.S. Cl.
CPC .............. *H04L 63/10* (2013.01); *G06F 21/62* (2013.01); *H04L 41/22* (2013.01)

(58) Field of Classification Search
CPC ....... H04L 63/104; H04L 41/22; H04L 63/10; H04L 12/1859; G06F 21/62
See application file for complete search history.

(56) References Cited

U.S. PATENT DOCUMENTS

| 2018/0248709 A1 | 8/2018 | Leydon et al. |
| 2018/0287982 A1 | 10/2018 | Draeger et al. |
| 2021/0240729 A1 | 8/2021 | Grant et al. |

FOREIGN PATENT DOCUMENTS

| AU | 2021101081 B4 * | 6/2021 | ............. G06F 16/13 |
| KR | 20190125933 A1 * | 1/2019 | ............. G06Q 50/30 |
| WO | WO-2018035492 A1 * | 2/2018 | ........... G06F 16/951 |

OTHER PUBLICATIONS

NPL Aug. 2021 (MatterMost) (Year: 2021).*
NPL Dec. 2019 (Discourse) (Year: 2019).*
(Continued)

*Primary Examiner* — Tri M Tran
(74) *Attorney, Agent, or Firm* — Lee & Hayes, P.C.

(57) ABSTRACT

The present disclosure is related to virtual spaces, such as channels, of a communication platform. In some cases, a channel may be designated as a private channel, which may permit access to the private channel by only users joined to the channel and may restrict/prevent access by all other users. The present disclosure is related to solutions for changing the private channel to a public channel, which may allow additional user accounts that were not associated with the private channel to discover and/or access the converted channel.

20 Claims, 6 Drawing Sheets

(56) References Cited

OTHER PUBLICATIONS

Anonymous : "Change Private Channels to Public—Mattermost Team Edition—General Questions—Mattermost Discussion Forums", Aug. 31, 2021, XP093018304, Retrieved from the Internet: URL:https://forum.mattermost.com/t/changeprivate-channels-to-public-mattermost-team -edition/12009 [retrieved on Jan. 27, 2023] the whole document, 3 pages.
PCT Search Report and Written Opinion mailed Feb. 6, 2023 for PCT application No. PCT/US2022/047374, 12 pages.
U.S. Appl. No. 16/993,859, filed Aug. 14, 2020, Butterfield, et al., "Electronic Board Associated With a Communication Platform", 45 pages.
U.S. Appl. No. 17/111,408, filed Dec. 3, 2020, Khosrowshahi, "Integrating a Third-Party Platform Into a Communication Platform", 53 pages.
U.S. Appl. No. 17/163,017, filed Jan. 29, 2021, McCue, et al., "Utilizing Message Metadata for Improving User Interface Presentation", 72 pages.
David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: < URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

CONVERTING PRIVATE CHANNELS TO PUBLIC CHANNELS

FIELD OF INVENTION

In association with a communication platform or service, a group of users may be organized under a domain (e.g., sometimes called a "workspace"), which is often associated with an enterprise, organization, business, school, or other discrete entity. The constituent users of the domain (e.g., sometimes called "members") often exchange communications related to a common goal, theme, purpose, or effort. A domain or workspace may represent a virtual space dedicated to the group and may include tools for the members to perform various functions. For example, the workspace may include tools for messaging, meeting, sharing data, scheduling/assigning tasks, reacting to posts, mentioning members in posts, and the like.

In some instances, a channel may be created within the workspace for organizing efforts around a specific project or sub-topic of the overall group, and the channel may include, or be joined by, a subset of workspace members. Some channels may be designated as public channels, which may be discoverable by all members of the workspace, even if a workspace member is not included in the subset. That is, even if a workspace member has not joined a public channel of the workspace, the workspace member is still able to search for, find, and view the content of, the public channel. In other instances, a channel of a workspace may be designated (e.g., using a setting) as a private channel, which may not be discoverable or viewable by workspace members that have not joined the private channel. That is, even though the private channel is part of the workspace, workspace members that have not joined the private channel may not be able to discover the private channel (e.g., when searching) or view the contents (e.g., messages, shared data, etc.). However, during a life or pendency of a private channel, the members may want to share the contents of the channel with the other members of the workspace. To do this, in existing systems, a member of the private channel may be required to generate a new public channel, and manually copy data from the private channel to the new public channel. This process may require excessive amounts of time and computing power to transfer the channel data, and may lead to a negative user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
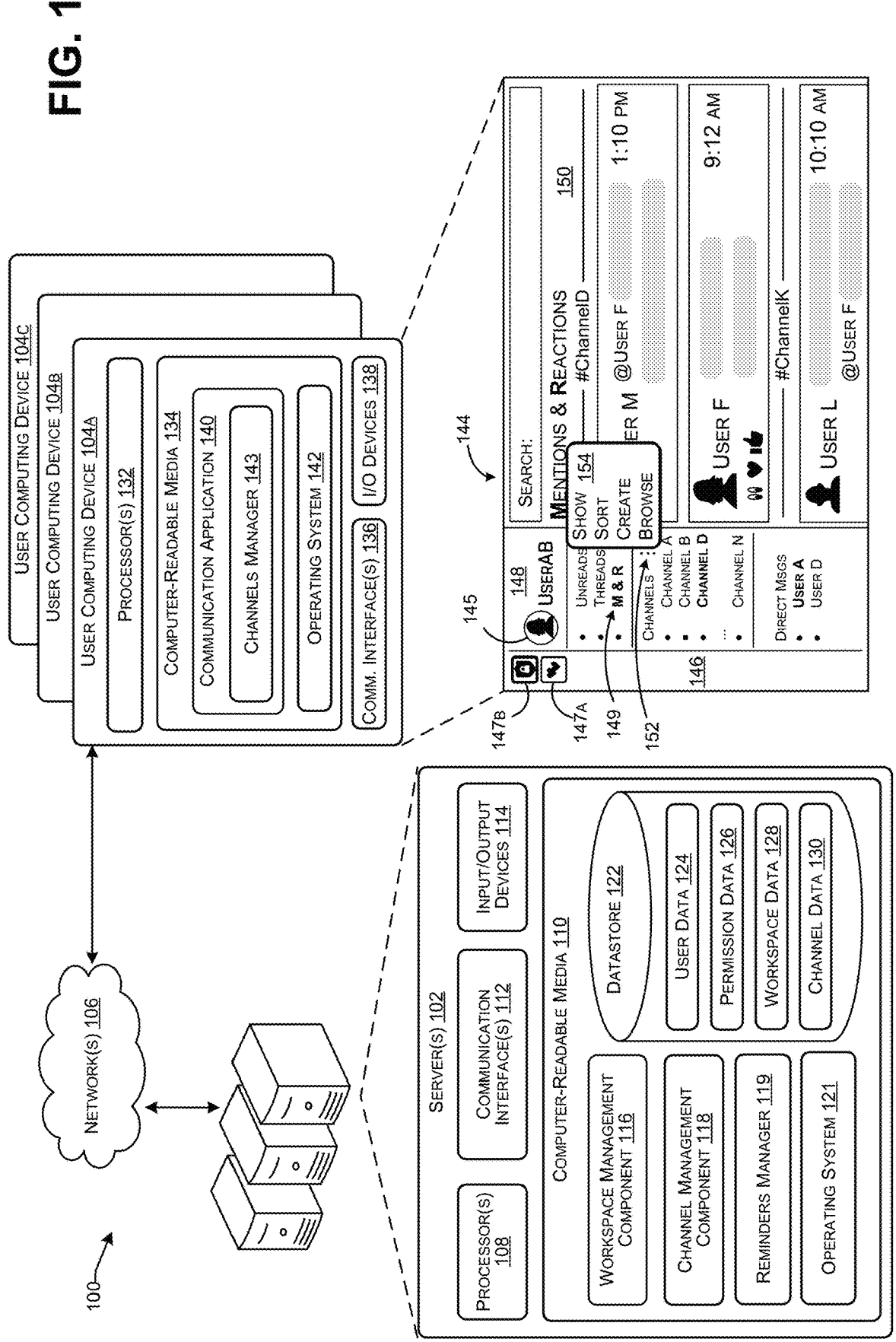
FIG. 1 illustrates a block diagram depicting an example system of computing devices usable to implement example techniques described herein.

As discussed above, in a communication platform, a group of users may be organized into a workspace, and within the workspace, various channels may be created for organizing efforts around a specific project or sub-topic of the overall group. In some examples, the channel may be designated as "private," in which case the private channel (and its contents) are not discoverable or viewable by workspace members that have not joined the private channel, even though the channel is associated with the workspace. The present disclosure is related to solutions for changing the private channel to a public channel, which allows other members of the workspace, not previously associated with the channel, to discover the channel (e.g., when searching), view the contents of the channel, and/or join the channel (e.g., without needing an invitation). Among other things, examples of the present disclosure that allow private channels to be converted to public channels help improve efficiencies by improving the discoverability of information to which members should have access. In addition, examples of the present disclosure may significantly reduce time and resources that might otherwise be used trying to copy over content from a private channel to another channel to allow others to access the content.

Having generally described some examples, more specific details will now be provided. In some examples of a communication platform, a workspace is created and represents a common or general domain associating a group of users (sometimes called "members"). For instance, a given workspace (e.g., associated with a business or organization) may include many members (e.g., tens, hundreds, thousands, etc.). In addition, within the workspace, members can create virtual spaces (sometimes referred to as "channels") to organize communications and content around a specific effort, project, topic, etc. associated with the workspace. In some examples, for a given channel, members may join the channel, which may result in being alerted to updates to the channel or otherwise being allowed to interact with the channel in ways potentially not permitted by members that have not joined.

Typically, any member may interact with other members and/or may request services of the communication platform (e.g., to post content to a channel) by using a communication application on a client. In addition, a member can often, via the communication application, discover channels associated with the workspace. For instance, a member may wish to discover other channels associated with the workspace, regardless of whether the member has joined the other channels. In some examples, the member may be able to (via the communication application) browse, or search for, channels associated with a workspace.

In some examples, members associated with a same workspace may have different permissions associated with the workspace channels. For example, in some instances, a channel may be designated as a private channel, which may affect permissions associated with any member that has not joined the private channel. In some examples, any member that has not joined the private channel is unable to discover the private channel when searching or browsing. In addition, any member that has not joined the private channel may be unable to view or post content associated with the private channel.

It may be desirable, in some instances, to change a channel from a private channel to a public channel, such as where a channel may have been mistakenly designated as a private channel or where it is no longer necessary to restrict access to the content of the private channel. Conventionally, changing a private channel to a public channel is challenging, and in some cases, not possible. Among other things, this inability to change from a private channel to a public channel may block a user from having access to important information that would otherwise be discoverable. In addition, this potential limitation may contribute to inefficient use of resources (e.g., time, computing resources, etc.) used searching for information that is blocked from discovery/access. Further, this restriction in changing a permission can increase duplicative efforts and resource consumption resulting from content being copied from a private channel to a more publicly accessible space. In contrast to conventional solutions, examples of the present disclosure include techniques for changing a channel from a private setting/designation to a public setting/designation.

In some examples, a channel settings interface may be provided that enables a member (e.g., a member with permission to change the private designation) to request that a private channel be changed to a public channel. Members granted permission to change a private channel to a public channel may depend on a workspace preference. For example, in some instances, permission to change a private channel to a public channel may be granted to one or more of a channel creator, a channel owner, a channel member, and/or a channel administrator.

In some examples, the channel settings interface may enable the requesting user to select a portion of data associated with a private channel to remain private, while other non-selected portions of the channel may become public. That is, the requesting user may designate first data to publish to all members of a public channel converted from a private channel, and second data to publish to members of the original private channel. The portion of data may be identified based on various criteria, such as data, content type, user, and the like. In examples, techniques of the present disclosure may maintain the private nature of the portion of data by applying one or more various techniques. For example, in some instances, the portion of data designated to remain private may still be associated with the public channel and be accessible to only approved user accounts (e.g., due to flags or other metadata associated with the portion of data and usable to selectively restrict access). In other examples, the portion of data designated to remain private may be bifurcated from the public data. In that case, the bifurcated private data may be archived, and/or the bifurcated private data and the public data may both exist moving forward as separate channels.

In at least some examples, changing a designation from private to public may have various implications in the communication platform. For instance, in one example, the change from private to public may initiate an approval workflow in which a member of the private channel may have an opportunity to approve or oppose the conversion to a public channel. In some examples, the approval workflow may allow a member to specify whether the member wants to keep private any content associated with the member (e.g., the member may approve converting the channel to public on the condition that content associated with (e.g., posted by) the member is kept private).

In some examples, a channel conversion from private to public may affect the manner in which the data is stored. For example, flags or other metadata that indicate whether data (e.g., a channel or data associated with a channel) is private or public may be updated to reflect the public nature. In addition, a search index associated with a channel may be updated to indicate the channel is public, and the updated search index may be used to determine that the channel is discoverable by a user account (e.g., when the user account is searching and/or browsing).

Referring now to FIG. 1, FIG. 1 illustrates an example system 100 for performing techniques described herein. In at least one example, the example environment 100 may be associated with a communication platform that may leverage a network-based computing system to enable users of the communication platform to exchange data. In at least one example, the communication platform may be "group-based" such that the platform, and associated systems, communication channels, messages, and/or virtual spaces, have security (e.g., that may be defined by permissions) to limit access to a defined group of users. In some examples, such groups of users may be defined by group identifiers, which may be associated with common access credentials, domains, or the like. In some examples, the communication platform may be a hub, offering a secure and private virtual space to enable users to chat, meet, call, collaborate, transfer files or other data, or otherwise communicate between or among each other. As described above, each group may be associated with a workspace, enabling users associated with the group to chat, meet, call, collaborate, transfer files or other data, or otherwise communicate between or among each other in a secure and private virtual space. In some examples, members of a group, and thus workspace, may be associated with a same organization. In some examples, members of a group, and thus workspace, may be associated with different organizations (e.g., entities with different organization identifiers).

In at least one example, the example system 100 may include one or more server computing devices (or "server(s)") 102. In at least one example, the server(s) 102 may include one or more servers or other types of computing devices that may be embodied in any number of ways. For example, in the example of a server, the functional components and data may be implemented on a single server, a cluster of servers, a server farm or data center, a cloud-hosted computing service, a cloud-hosted storage service, and so forth, although other computer architectures may additionally or alternatively be used.

In at least one example, the server(s) 102 may communicate with one or more user computing devices 104a, 104b, and/or 104c (may also be referred to as user computing device(s) 104) via one or more network(s) 106. That is, the server(s) 102 and the user computing device(s) 104 may transmit, receive, and/or store data (e.g., content, information, or the like) using the network(s) 106, as described herein. The user computing device(s) 104 may be any suitable type of computing device, e.g., portable, semi-portable, semi-stationary, or stationary. Some examples of the user computing device(s) 104 may include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While FIG. 1 shows the user computing devices 104a, 104b, and 104c, in practice, the example system 100 may include additional (e.g., tens of, hundreds of, thousands of, millions of) user computing devices.

In at least one example, user computing devices, such as the user computing device(s) 104, may be operable by users to, among other things, access communication services via the communication platform. A user may be an individual, a group of individuals, an employer, an enterprise, an organization, or the like. In some examples, a user (e.g., the same user) may use multiple computing devices to access communication services via the communication platform. For example, the user may switch or alternate between different user computing devices 104 when accessing the communication services.

The network(s) 106 may include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications may depend at least in part upon the type of network, the environment selected, or both. Protocols for communicating over such network(s) 106 are well known and are not discussed herein in detail.

In at least one example, the server(s) 102 may include one or more processors 108, computer-readable media 110, one or more communication interfaces 112, and input/output devices 114.

In at least one example, each processor of the processor(s) 108 may be a single processing unit or multiple processing units and may include single or multiple computing units or multiple processing cores. The processor(s) 108 may be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 may be one or more hardware processors and/or logic circuits of any suitable type specifically programmed or configured to execute the algorithms and processes described herein. The processor(s) 108 may be configured to fetch and execute computer-readable instructions stored in the computer-readable media, which may program the processor(s) to perform the functions described herein.

The computer-readable media 110 may include volatile and nonvolatile memory and/or removable and non-removable media implemented in any type of technology for storage of data, such as computer-readable instructions, data structures, program modules, or other data. Such computer-readable media 110 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired data and that may be accessed by a computing device. Depending on the configuration of the server(s) 102, the computer-readable media 110 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 110 may be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media may optionally include a workspace management component 116, a channel management component 118, an operating system 121, and a datastore 122.

In at least one example, the workspace management component 116 may manage workspaces. That is, in at least one example, the communication platform may be partitioned into different workspaces, which may be associated with different groups of users, as described above. As described above, each workspace may be associated with a group identifier and one or more user accounts may be mapped to, or otherwise associated with, the group identifier. User(s) corresponding to such user account(s) may be "members" of the group.

In some examples, the workspace management component 116 may manage workspace membership. That is, the workspace management component 116 may receive requests to associate users with individual workspaces and the workspace management component 116 may associate user accounts associated with such users with group identifiers associated with the individual workspaces. For example, responsive to receiving a request to add a user to a workspace, the workspace management component 116 may associate a user account of the user with a group identifier of the workspace. The workspace management component 116 may disassociate user accounts and group identifiers, for example, when a user is removed from a workspace.

In at least one example, the channel management component 118 may manage communication channels. As described above, in at least one example, the communication platform may be a channel-based messaging platform, that in some examples, may be usable by group(s) of users. Users of the communication platform may communicate with other users via communication channels. A communication channel, or virtual space, may be a data route used for exchanging data between and among systems and devices associated with the communication platform. In at least one example, the channel management component 118 may establish a communication channel between and among various user computing devices, allowing the user computing devices to communicate and share data between and among each other. In at least one example, the channel management component 118 may manage such communications and/or sharing of data.

In some examples, a channel may include one or more members that have joined the channel, and in some instances, fewer than all members of a workspace may join the channel. As such, the channel management component 118 may perform operations associated with tracking, permitting, inviting, etc. the joining of members associated with a channel. In addition, in some examples, a channel may be designated as a "public" channel, in which case members of a workspace that have not joined the channel of the workspace may still be able to interact with the channel (e.g., discover the channel when searching, view the content of the channel, join the channel without an invitation, etc.). In some examples, a channel may be designated as a "private" channel, in which case members of a workspace that have not joined the channel of the workspace may not be allowed to interact with the channel (e.g., the channel cannot be discovered when searching/browsing, viewed, or joined without an invitation). As such, in some examples, the channel management component 118 may perform operations related to a channel being public or private. In some examples, data associated with a communication channel may be presented via a user interface, such as content shared with or associated with the channel, identifiers of members that have joined the channel, the private or public nature of the channel, and the like. In at least one example, the channel management component 118 may interact with the workspace management component 116 to manage the generation, presentation, and/or updating of user interfaces.

In at least one example, the operating system 121 may manage the processor(s) 108, computer-readable media 110, hardware, software, etc. of the server(s) 102.

In at least one example, the datastore 122 may be configured to store data that is accessible, manageable, and updatable. In some examples, the datastore 122 may be integrated with the server(s) 102, as shown in FIG. 1. In other examples, the datastore 122 may be located remotely from the server(s) 102 and may be accessible to the server(s) 102 and/or user device(s), such as the user computing device(s) 104. The datastore 122 may comprise multiple databases, which may include user data 124, permission data 126, workspace data 128, and channel data 130. Additional or alternative data may be stored in the data store and/or one or more other data stores.

In at least one example, the user data 124 may store data associated with users of the communication platform. In at least one example, the user data 124 may store data in user profiles (which may also be referred to as "user accounts"), which may store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status (e.g., user status such as active, away, inactive, etc.), a token, and the like.

In at least one example, the permission data 126 may store data associated with permissions of individual users of the communication platform. In some examples, permissions may be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user may be mapped to, or otherwise associated with, an account or profile associated with the user data 124. In some examples, permissions may indicate which users may communicate directly with other users, which channels a user is permitted to access, restrictions on individual channels, which workspaces the user is permitted to access, restrictions on individual workspaces, and the like. In at least one example, the permissions may support the communication platform by maintaining security for limiting access to a defined group of users. In some examples, such users may be defined by common access credentials, group identifiers, or the like, as described above. In some examples, the permission data 126 may indicate whether a user is permitted to control or change designations or settings associated with whether a channel is private or public.

In at least one example, the workspace data 128 may store data associated with individual workspaces. As described above, the communication platform may be partitioned into workspaces associated with groups of users. In at least one example, a group identifier may be associated with a workspace. In at least one example, the group identifier may indicate a physical address in the workspace data 128 where data related to the corresponding workspace is stored. In at least one example, data associated with workspace permissions may be stored in association with the group identifier, data identifying users associated with the workspace may be stored in association with the group identifier, data associated with messages and/or other content associated with the workspace may be stored in association with the group identifier, data associated with communication channels associated with the workspace may be stored in association with the group identifier, and the like. In some examples, workspaces may be associated with one or more organization identifiers, which may be associated with organizations or other entities associated with the communication platform. In some examples, such data may be mapped to, or otherwise associated with, other types of data in the datastore 122 (e.g., the user data 124, the permission data 126, the channel data 130, etc.).

In at least one example, the channel data 130 may store data associated with individual communication channels. In at least one example, the channel management component 118 may establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. As indicated above, a communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). As such, the channel data 130 may store data associated with the public or private designation. For example, in some instances, the channel data 130 may include tags or other metadata associated with the channel and/or with the content of the channel, and the tags may be referenceable in various contexts to help determine whether a user or member is permitted to interact with the channel or content. In at least some examples, the channel data 120 may include, or be associated with, a channel search index that includes data indicating whether a channel is private or public. In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 may be partitioned into discrete items of data that may be accessed and managed individually (e.g., data shards). Data shards may simplify many technical tasks, such as data retention, unfurling (e.g., detecting that message contents include a link, crawling the link's metadata, and determining a uniform summary of the metadata), and integration settings. In some examples, data shards may be associated with organizations, groups (e.g., workspaces), communication channels, users, or the like.

In some examples, individual organizations may be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself may be the owner of the database shard and has control over where and how the related data is stored. In some examples, a database shard may store data related to two or more organizations (e.g., as in a shared channel).

In some examples, individual groups may be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself may be the owner of the database shard and has control over where and how the related data is stored.

In some examples, a communication channel may be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization may be the owner of the database shard and may control where and how the related data is stored.

In some examples, individual users may be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself may be the owner of the database shard and has control over where and how the related data is stored.

The communication interface(s) 112 may include one or more interfaces and hardware components for enabling communication with various other devices (e.g., the user computing device(s) 104), such as over the network(s) 106 or directly. In some examples, the communication interface(s) 112 may facilitate communication via Websockets, Application Programming Interfaces (APIs) (e.g., using API calls), HyperText Transfer Protocols (HTTPs), etc.

The server(s) 102 may further be equipped with various input/output devices 114 (e.g., I/O devices). Such I/O devices 114 may include a display, various user interface controls (e.g., buttons, joystick, keyboard, mouse, touch screen, etc.), audio speakers, connection ports and so forth.

In at least one example, the user computing device(s) 104 may include one or more processors 132, computer-readable media 134, one or more communication interfaces 136, and input/output devices 138 (I/O devices).

In at least one example, each processor of the processor(s) 132 may be a single processing unit or multiple processing units, and may include single or multiple computing units or multiple processing cores. The processor(s) 132 may comprise any of the types of processors described above with reference to the processor(s) 108 and may be the same as or different than the processor(s) 108.

The computer-readable media 134 may comprise any of the types of computer-readable media 134 described above with reference to the computer-readable media 110 and may be the same as or different than the computer-readable media 110. Functional components stored in the computer-readable media may optionally include a communication application 140 (e.g., for interacting with the server(s) 102) and an operating system 142.

In at least one example, the operating system 142 may manage the processor(s) 132, computer-readable media 134, hardware, software, etc. of the server(s) 102.

The communication interface(s) 136 may include one or more interfaces and hardware components for enabling communication with various other devices (e.g., the user computing device(s) 104), such as over the network(s) 106 or directly. In some examples, the communication interface(s) 136 may facilitate communication via Websockets, APIs (e.g., using API calls), HTTPs, etc.

The user computing device(s) 104 may further be equipped with various input/output devices 138 (e.g., I/O devices). Such I/O devices 138 may include a display, various user interface controls (e.g., buttons, joystick, keyboard, mouse, touch screen, etc.), audio speakers, connection ports and so forth.

In at least one example, the communication application 140 may be a mobile application, a web application, or a desktop application, which may be provided by the communication platform or which may be an otherwise dedicated application. In some examples, individual user computing devices associated with the system 100 may have an instance or versioned instance of the communication application 140, which may be downloaded from an application store, accessible via the Internet, or otherwise executable by the processor(s) 132 to perform operations as described herein. That is, the communication application 140 may be an access point, enabling the user computing device(s) 104 to interact with the server(s) 102 to access and/or use communication services available via the communication platform. In at least one example, the communication application 140 may facilitate the exchange of data between and among various other user computing devices, for example via the server(s) 102. In at least one example, the communication application 140 may present user interfaces, as described herein. In at least one example, a user may interact with the user interfaces via touch input, keyboard input, mouse input, spoken input, or any other type of input (e.g., using the I/O devices 138).

The communication application 140 may include various functional components, and in at least one example, the application 140 includes a channels manager 143. In some examples, the channels manager 143 may perform one or more operations enabling a member to perform various channel-related functions, such as viewing or sorting a channel listing, browsing channels associated with the workspace, creating a new channel with member-designated characteristics (e.g., name, purpose, joined members, public or private, etc.).

A non-limiting example of a user interface 144 is shown in FIG. 1. The user interface 144 may present information associated with a user account (e.g., UserAB as indicated by the user profile indicator 145). As illustrated in FIG. 1, the user interface 144 can present data associated with one or more channels and, in some examples, one or more workspaces. That is, in some examples, the user interface 144 can enable a user to access multiple workspaces. In some examples, the user interface 144 can include a first section 146 (e.g., which can be a portion, pane, or other partitioned unit of the user interface 144) that includes user interface element(s) associated with workspace(s) with which the user (e.g., account of the user) is associated. Two user interface elements are illustrated in FIG. 1, including a first user interface element 147a representing a first workspace and a second user interface element 147b representing a second workspace. As described above, such workspaces can be associated with different domains. In some examples, a user can interact with the first user interface element 147a or the second user interface element 147b to access the corresponding workspace. In some examples, a user can be prompted to provide a credential to authenticate with the corresponding workspace. While two user interface elements 147a and 147b are illustrated, any number of user interface elements can be presented via the first section 146, which can be associated with one or more domains.

In some examples, the user interface 144 may include a second section 148 (e.g., which can be a portion, pane, or other partitioned unit of the user interface 144) that includes user interface element(s) representing data associated with the workspace(s) with which the user (e.g., account of the user) is associated. In some examples, user interface element(s) presented via the second section 148 can represent virtual space(s) with which the user has access via a particular workspace or multiple workspaces. In some examples, the second section 148 may include user interface elements that allow the user to take additional action with respect to virtual spaces. For example, by selecting one of the channel identifiers in the section 148, a user may be able to view (via the user interface 144) contents associated with the selected channel. In some examples, the second section 148 may include a menu extension indicator 152 that, when selected, causes a channels menu 154 to be presented. In addition, the channels menu 154 may present selectable links that, when selected by a user, facilitates a corresponding function, such as controlling the listing of channels in the second section 148, creating a new channel, or browsing channels associated with the selected workspace (e.g., presenting all channels accessible to the user). Additional details associated with the second region 148 and indicator(s) are described below with reference to FIG. 2A.

In at least one example, the user interface 144 can include a third section 150 (e.g., which can be a portion, pane, or other partitioned unit of the user interface 144) that can be associated with a data feed (or "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the third section 150 can include (e.g., when "browse" is selected in the menu 154) a listing of channels to which the user has access. In at least one example, data associated with the third section 150 can be associated with the same or different workspaces. That is, in some examples, the third section 150 can present data associated with the same or different workspaces via an integrated feed. In some examples, the data can be organized and/or is sortable by workspace, time (e.g., when associated data is posted or an associated operation is otherwise performed), type of action, channel, user, or the like. In some examples, such data can be associated with an indication of which user (e.g., member of the channel) posted the message and/or performed an action. In examples where the third section 150 presents data associated with multiple workspaces, at least some data can be associated with an indication of which workspace the data is associated with. Additional details associated with the user interface 144, and the third region 150, are described below with reference to FIG. 2A.

While techniques described herein are described as being performed by the workspace management component 116, the channel management component 118, and the communication application 140, techniques described herein may be performed by any other component, or combination of components, which may be associated with the server(s) 102, the user computing device(s) 104, or a combination thereof.

Figure 2A:
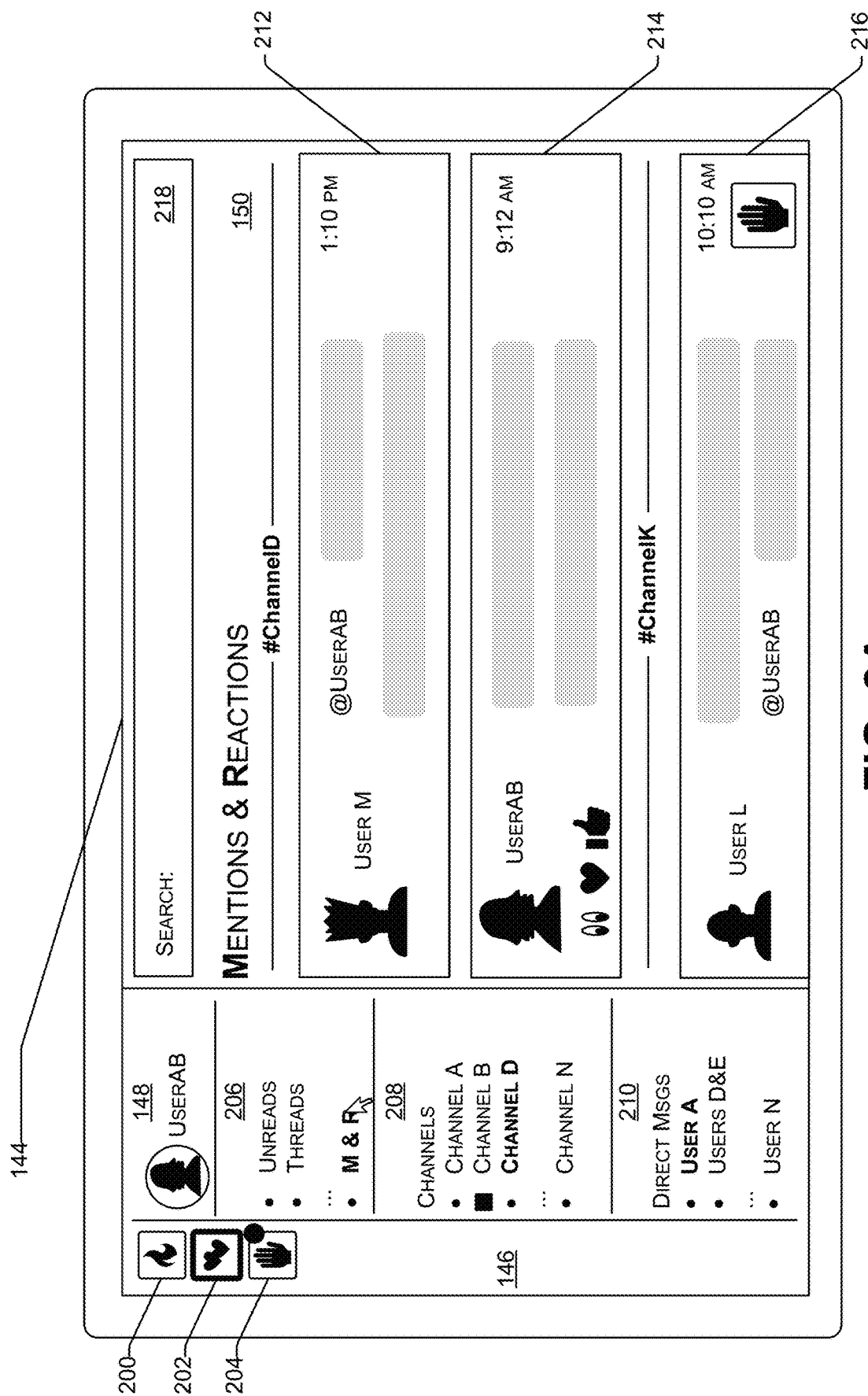
FIG. 2A illustrates an example user interface, as described herein.

Referring to FIG. 2A, FIG. 2A illustrates additional details associated with the user interface 144 that presents data associated with multiple workspaces, as described above with reference to FIG. 1. As described above, in at least one example, the user interface 144 can include the first region 146, or pane, that includes indicator(s) (e.g., user interface element(s) or object(s)) of workspace(s) with which the user (e.g., account of the user) is associated. As illustrated in FIG. 2A, the user (e.g., UserAB) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200, 202, and 204, presented via the first region 146. In at least one example, a user account of the user (e.g., UserAB) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200, 202, and 204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200, 202, and 204 can be associated with another indicator indicating that the corresponding workspace has been updated. An example is shown with respect to the third indicator 204.

While three indicators 200, 202, and 204 are illustrated in FIG. 2A, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include the second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., UserAB) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

Figure 2B:
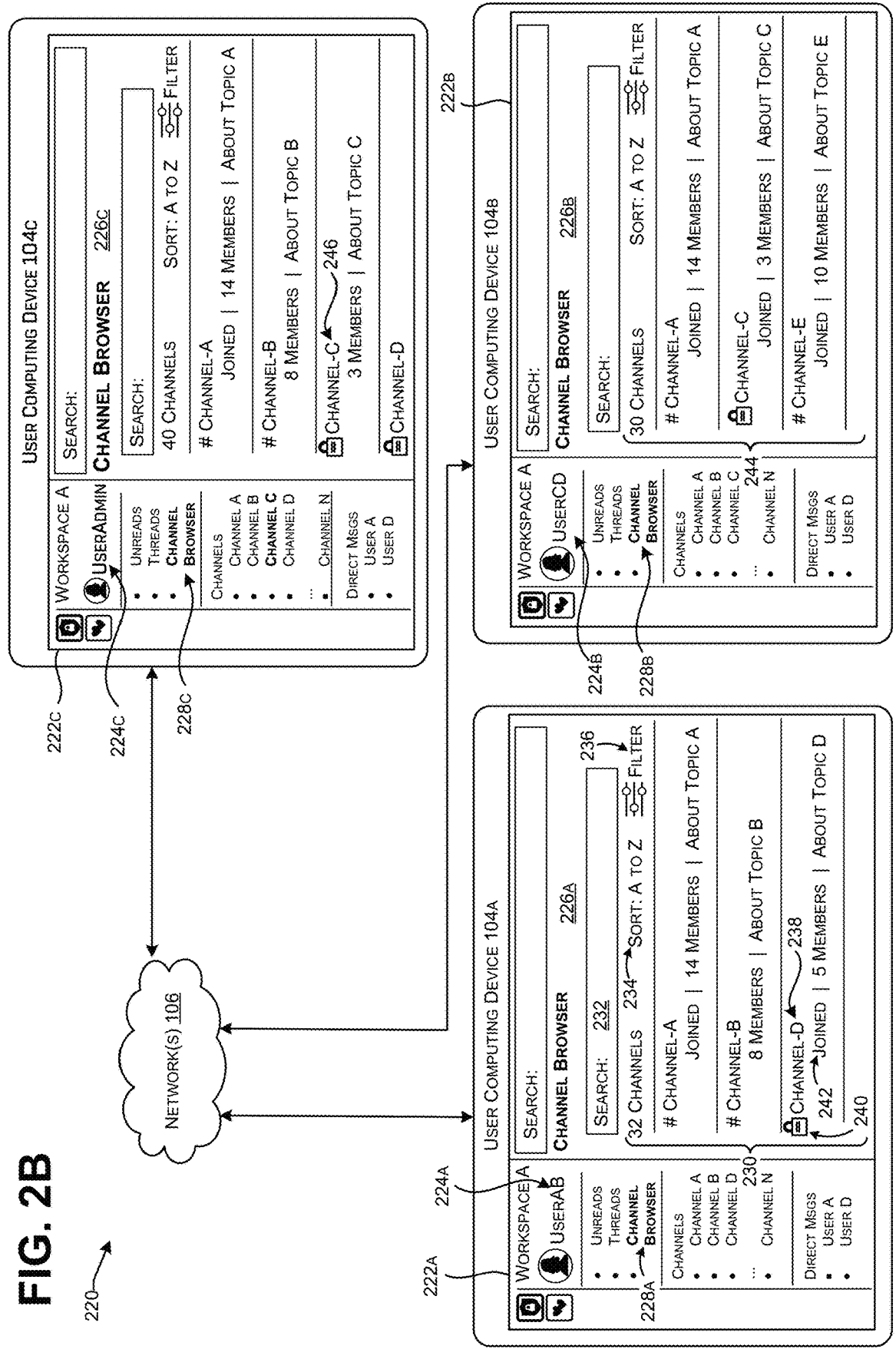
FIG. 2B illustrates example user interfaces that may be presented on networked user computing devices and that depict different channel discoverability in each user interface, as described herein.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown in FIG. 2A and an example of which is shown in FIG. 2B) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include the third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2A, the user (e.g., UserAB), can interact with the user interface 144 to view data associated with the virtual space corresponding to "mentions and reactions." In FIG. 2A, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., UserAB) in a message, represented by the indicator 212 (e.g., a user interface element, object, etc.), which is associated with a communication channel (e.g., #ChannelD). The user (e.g., UserAB) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., UserAB) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

Additional details associated with the user interface 144 and the communication platform, in some non-limiting examples, are described with reference to FIG. 2B, which depicts a system 200 including the user computing devices 104a, 104b, and 104c (e.g., described with respect to FIG. 1) connected by the network(s) 106. In addition, the user computing devices 104a, 104b, and 104c are associated with a respective user interface 222a, 222b, and 222c, related to a respective user account. For example, the user computing device 104a is associated with "UserAB" (as indicated by the user-account indication 224a); the user computing device 104b is associated with "UserCD" (as indicated by the user-account indication 224b); and the user computing device 104c is associated with "UserAdmin" (as indicated by the user-account indication 224c). In an example, the UserAB, the UserCD, and the UserAdmin are all members of the same "Workspace A." In addition, the user interfaces 222a, 222b, and 222c are all presenting a channel-browser interface in the section 226a, 226b, and 226c (respectively), such as in response to a request from the user to browse channels to which the user has access. For example, the channel-browser interface may be presented in response to selection of the channel-browser indicator 228a, 228b, or 228c (or in response to "browse" being selected in the menu 154 in FIG. 1).

In examples of the present disclosure, a channel-browser interface may include various tools configured to perform various functionalities. For example, the channel-browser interface in section 226a may present a listing of channels 230 to which a user account has access to view, can join (e.g., without invitation), and/or can post content. In addition, the channel-browser interface may include a search function 232 that permits a user to search for channels included in the channels listing. Furthermore, the channel-browser interface may include a sort interface tool 234 for sorting the channel listing (e.g., by newest, alphabetically, etc.) and/or a filter interface tool 236 for filtering the channel listing (e.g., public channel type, private channel type, shared status, etc.). The channel-browser interfaces in sections 226b and 226c may include similar features.

In accordance with aspects of the present disclosure, members associated with a same workspace (e.g., Workspace A in FIG. 2B) may have different levels of access to different channels, such as based on granted/denied permissions and/or a private or public designation associated with a channel. For example, in some instances, a user account that has joined a channel (e.g., a public channel or a private channel) may have permission to view content associate with the channel and post content to the channel. In addition, in some examples, members of a private channel (that have joined the private channel) may have permission to change settings associated with the private channel (e.g., changing the channel from a private channel to a public channel). In some examples, members of a private channel may not have permission to change the private channel to a public channel.

In some examples, a user account designated as an administrator may have different permissions, such as based on the permission settings associated with the workspace and/or specified by the workspace owner or an organization associated with the workspace. For example, in some instances, an administrator may have limited access to private channels. In some examples, the administrator may have permission to access only limited information associated with a private channel (e.g., member list, channel description, etc.), but the administrator may not have permission to view content posted to the private channel. In some examples, regardless of whether the administer is able to view content of the private channel, the administrator may have permission to change settings associated with a private channel (e.g., change the private channel to a public channel). In some examples, the administrator may not be able to discover private channels, such as when searching or browsing via the channel-browser interface. In some examples, via searching or browsing, an administrator may be able to discover limited information associate with a private channel (e.g., the name associated with the private channel, but not other details associated with the private channel). In some examples, an administrator may be able to make administrative changes to channels (e.g., all channels associated with a workspace), but the private channel(s) may not be discoverable to the administrator user account, unless the administrator user account has joined the private channel. In other examples, an administrator user account may have permission to access at least a portion of the content associated with a private channel and to make administrative changes associated with the private channel.

As an illustrated example, referring to FIG. 2B, the user account "UserAdmin" represented in user interface 222c may have permission to make changes with respect to all channels, even private channels not discoverable by UserAB and/or UserCD (but not necessarily discover or view content of private channels). For example, UserAB may have permission to access (e.g., discover when searching or browsing, post in, etc.) a "Channel-D," which is represented by the channel indicator 238 in the user interface 222a. In addition, Channel-D may be a private channel, as represented by the private-channel indicator 240. The information associated with Channel-D and depicted in the user interface 222a includes a joined indicator 242, which indicates that UserAB has joined Channel D and has access to Channel D. Based on UserAB having access to Channel D, information associated with Channel D is presented by the channel browser in section 226a, and in some examples, Channel D would be discoverable by UserAB, such as by using the search function 232. In some examples, UserAB may have permission to make administrative changes to Channel-D (e.g., change Channel-D from a private channel to a public channel). However, in some examples, UserAB may not have permission to make some administrative changes to Channel-D.

Continuing with the example in FIG. 2B, in examples, other user accounts associated with the Workspace A may not have access to Channel D, which is private. For example, the listing 244 (in user interface 222b) associated with UserCD does not include information associated with Channel D (e.g., the listing in A to Z order skips from Channel-C to Channel-E). In addition, UserCD would not be able to discover information associated with Channel D (e.g., by searching or otherwise), and as explained previously access restrictions may be enforced based on permissions associated with user accounts, channel metadata tags, channel indexes, and the like. In other examples, UserAdmin may have permission to make administrative changes to Channel-D, which is listed in the channel browser associated with the user interface 222c, but in some cases, permission (to UserAdmin) to view content or engage in other activities with respect to Channel-D may be restricted. In another example, UserCD may have access to a private "Channel-C," and UserAdmin may be able to make administrative changes to Channel-C. But Channel-C may not be accessible to, or discoverable by, UserAB. In some examples, an administrative user account may have permission to change a channel from a private channel to a public channel and lack permission to discover the private channel (e.g., via searching or browsing). As such, the communication platform may provide the administrative user account with a secure dashboard to make such changes and/or the administrative user account may have other database access to execute such changes.

In some examples, it may be desirable to change a channel from a private designation to a public designation. For example, a channel may have been mistakenly designated as a private channel. Or, in some cases, a change in circumstances (e.g., time, organizational perspective on what should be private versus what should be shared, etc.) may prompt a change from private to public. Absent examples of the present disclosure, changing a channel designation from private to public may be challenging, and in some cases, not possible. Among other things, this inability to change from a private channel to a public channel may block a user from having access to important information that would otherwise be discoverable. In addition, this potential limitation may contribute to inefficient use of resources (e.g., time, computing resources, etc.) used searching for information that is blocked from discovery/access. Further, this restriction in changing a designation can increase duplicative efforts and resource consumption resulting from content being copied from a private channel to a more publicly accessible space. In contrast to conventional solutions, examples of the present disclosure include techniques for changing a channel from a private setting/designation to a public setting/designation.

Figure 3:
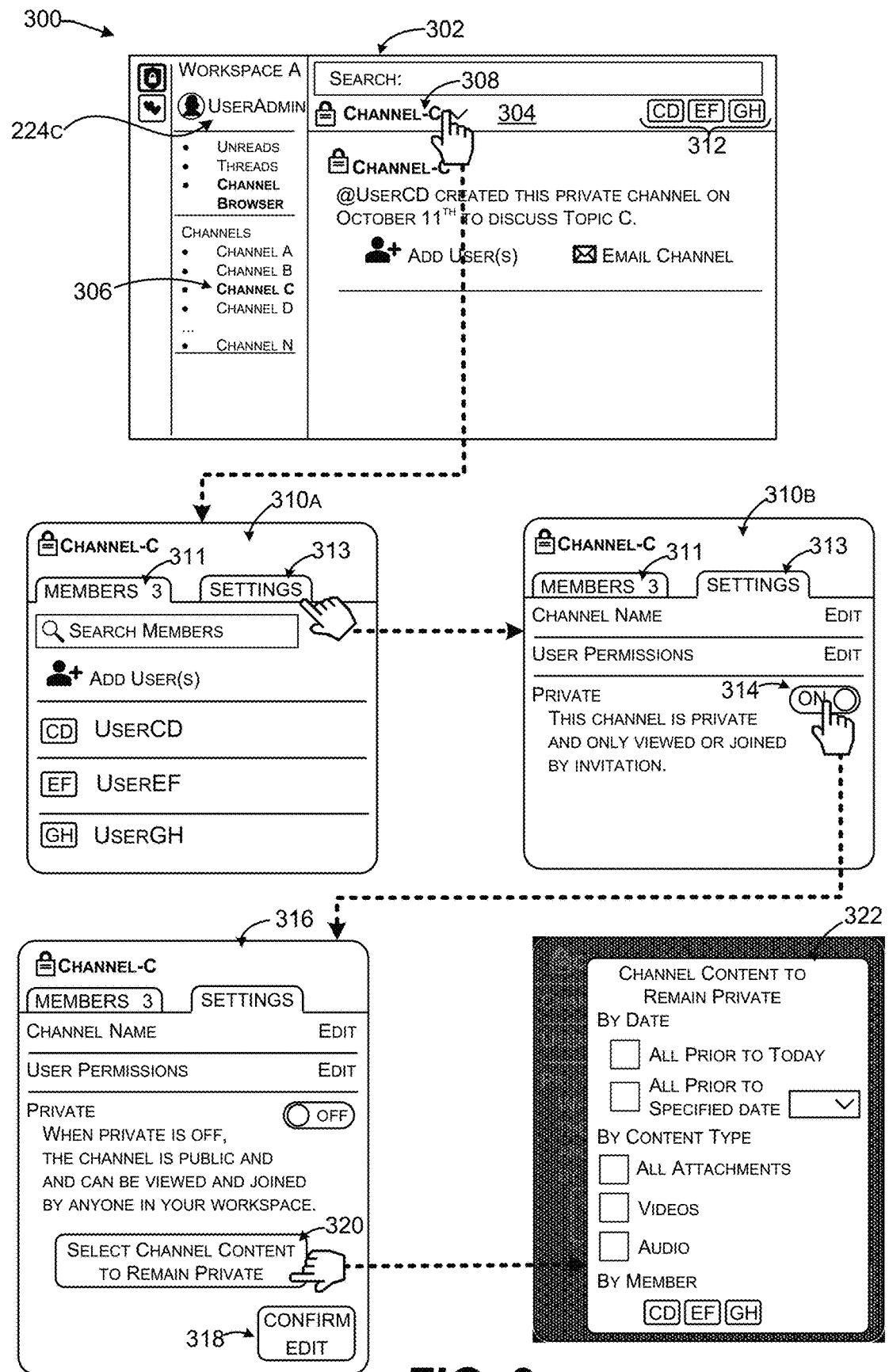
FIG. 3 illustrates user interfaces for changing a private channel to a public channel, as described herein.

Referring to FIG. 3 a flow 300 of user interfaces are depicted that, in some examples, could be navigated by a user interacting with links (e.g., interaction represented by the hand icons in FIG. 3) associated with the user interfaces. For example, the user interface 302 includes a section 304 presenting information associated with a channel (e.g., Channel-C). The content associated with the channel may be presented in response to a user selecting the channel from a channel listing, such as by selection of the channel indicator 306 (or selection of the channel indicator 246 in FIG. 2). In addition, the user interface 302 includes a settings interface link 308 that, when selected, navigates to a settings interface 310a and/or 310b. That is, in some examples, selecting the "Channel-C" text and/or the drop-down "V" indicator may navigate to a channel settings user interface, such as the settings interface 310a/310b (collectively the settings interface 310). The settings interface 310 may include a pop-up style interface (e.g., that could be presented as an overlay in front of the user interface 302), or in some examples, the settings interface 310 may replace the content in portion 304 presented in association with the channel.

In examples of the present disclosure, the settings interface 310 may include various tabs or panes for viewing various information associated with a channel. For example, the settings interface 310 may include a members tab 311 that, when selected, presents a searchable listing of members associated with (e.g., joined to) the channel. For example, in FIG. 3, the settings interface 310a presents information associated with the members tab 311, including three members joined to Channel-C, which is also reflected by the joined members indicators 312 in user interface 302. In addition, the settings interface 310 may include a settings tab 313 that, when selected, includes various fields or channel details (as depicted by user interface 310b) that can be edited by a user account.

In some examples, the editable settings may depend on permissions associated with a user account. For instance, in some cases, settings that may be edited by non-administrators and/or non-owners may be limited or restricted, as compared with settings that are editable by administrators and/or owners. Referring to the settings interface 310b, an administrator (e.g., as indicated by the indicator 204c) may be able to edit the channel name, user permissions, and/or the private/public designation associated with the channel. In addition, non-administrator members that have joined the channel (e.g., Users CD, EF, and GH as indicted by the joined member indicators 312 and listed in the settings interface 310a), may have more restricted permission to edit different settings (e.g., channel name but not private designation). In some examples, both administrators and joined non-administrators may be able to edit the private setting.

Enforcing editing permissions may be carried out in various manners. In some examples, a user may submit a request to change a private channel to a public channel. As such, a determination may be made as to whether the user submitting the request has permission to change the channel from private to public. In some examples, the settings interface 310b may be tailored based on permissions associated with a user. For example, if a user does not have permission to change a private channel to a public channel, then the settings interface 310b may be tailored to not include any interface elements for submitting such a change request and/or any such interface elements may be locked to user interactions. On the other hand, if a user does have permission to change the private channel to a public channel, then the settings interface 310b may reflect such modification options with appropriate user interface elements to indicate such a change is possible.

In some examples, the settings interface 310b may include a selectable affordance 314 that is associated with the private designation and that, when selected, can change the channel from a private channel to a public channel. In addition, selection of the affordance 314 (e.g., thereby causing the affordance to change from "ON" to "OFF") may render additional user interface elements, such as associated with the user interface 316. In some examples, the user interface 316 may include a confirmation indicator 318 that, when selected, can confirm the change from private to public. In addition, in some examples, the user interface 316 may include a privacy configuration button 320 that, when selected, invokes a user interface 322 to configure additional settings associated with the private/public designation. For example, when changing a channel from private to public, it may be desirable to specify information associated with the channel to remain private. In some examples, information may be classified based on a date, such that information associated with the channel prior to a specified date remains private and information associated with the channel after a specified date is public. In some examples, information may be classified based on a content type (e.g., attachments, videos, audios, images, etc.), such that information classified as a specified type remains private and information not classified as the specified type is public. In some examples, information may be classified based on a user account associated with the information (e.g., user account that posted the content), such that information associated with one or more specified user accounts remains private and information not associated with one or more specified user accounts becomes public.

In some examples, such as via the options presented in the user interface 322, a portion of data associated with a private channel may be excluded from the public channel. Examples of the present disclosure may maintain the private nature of the portion of data by applying one or more various techniques. For example, in some instances, the portion of data designated to remain private may still be associated with the public channel and be accessible to only approved user accounts (e.g., due to flags or other metadata associated with the portion of data and usable to selectively restrict access). In other examples, the portion of data designated to remain private may be bifurcated from the public data. In that case, the bifurcated private data may be archived. And/or in some examples, the bifurcated private data and the public data may both exist moving forward as separate channels.

In at least some examples, changing a designation from private to public may have various implications in the communication platform. For instance, in one example, the change from private to public may initiate an approval workflow in which a members who had joined the channel when it was private may have an opportunity to affect the change to a public channel. In one example, the approval workflow may include an approval request that invites each joined member to either approve the change to public or oppose the change to public. In some examples, the approval workflow may allow a member to specify whether the member wants to keep private any content associated with the member (e.g., the member may approve converting the channel to public on the condition that content associated with (e.g., posted by) the member is kept private).

In at least some examples, the request to change a channel from private to public may include verifying whether the member submitting the request has permission to make the change. For example, permissions associated with a user account and/or with a channel may be referenced to determine whether the user account is permitted to make the change. In some examples, permission may be based on a role associated with a user account and with the channel. For example, for each channel, one or more roles may be assigned in association with the channel. Examples of roles may include a channel creator, channel owner, channel or workspace administrator, workspace owner, and the like. In some examples, the permission to change from a private channel to a public channel is reserved for user accounts controlled by users presumed to have requisite organizational knowledge appropriate to determine whether to make a change from private to public.

In at least some examples, changing a channel from private to public may affect permissions that are associated with the channel. That is, in some instances, the private channel may include a first set of permissions that specify permissible actions by designation user accounts, and when changed to a public channel, the public channel may include a second set of permissions that are less restrictive than the first set of permissions (e.g., the second set of permissions allows more user accounts to take more actions with respect to the channel).

In some examples, a change from private to public may affect the manner in which the data is handled on the backend, such as by the server(s) 102. For example, flags or other metadata that indicate whether data (e.g., a channel or data associated with a channel) is private or public may be updated to reflect the public nature. Among other things, the flags may be used to assess discoverability, accessibility, joinability, etc. In some examples, a search index associated with a channel may be updated to indicate the channel is public, and the updated search index may be used to determine that the channel is discoverable by a user account (e.g., when the user account is searching and/or browsing).

As explained, a channel may be shared among different workspaces or other groups of users. In examples of the present disclosure, a channel may be changed from private to public with respect to one workspace, while the channel may remain private with respect to the other workspace. As such, a first organization may be able to share information that was private with users of the first organization with lower concerns of the users of the second organization also having access (e.g., based on the unilateral action of the first organization to change the channel to public).

Figure 4:
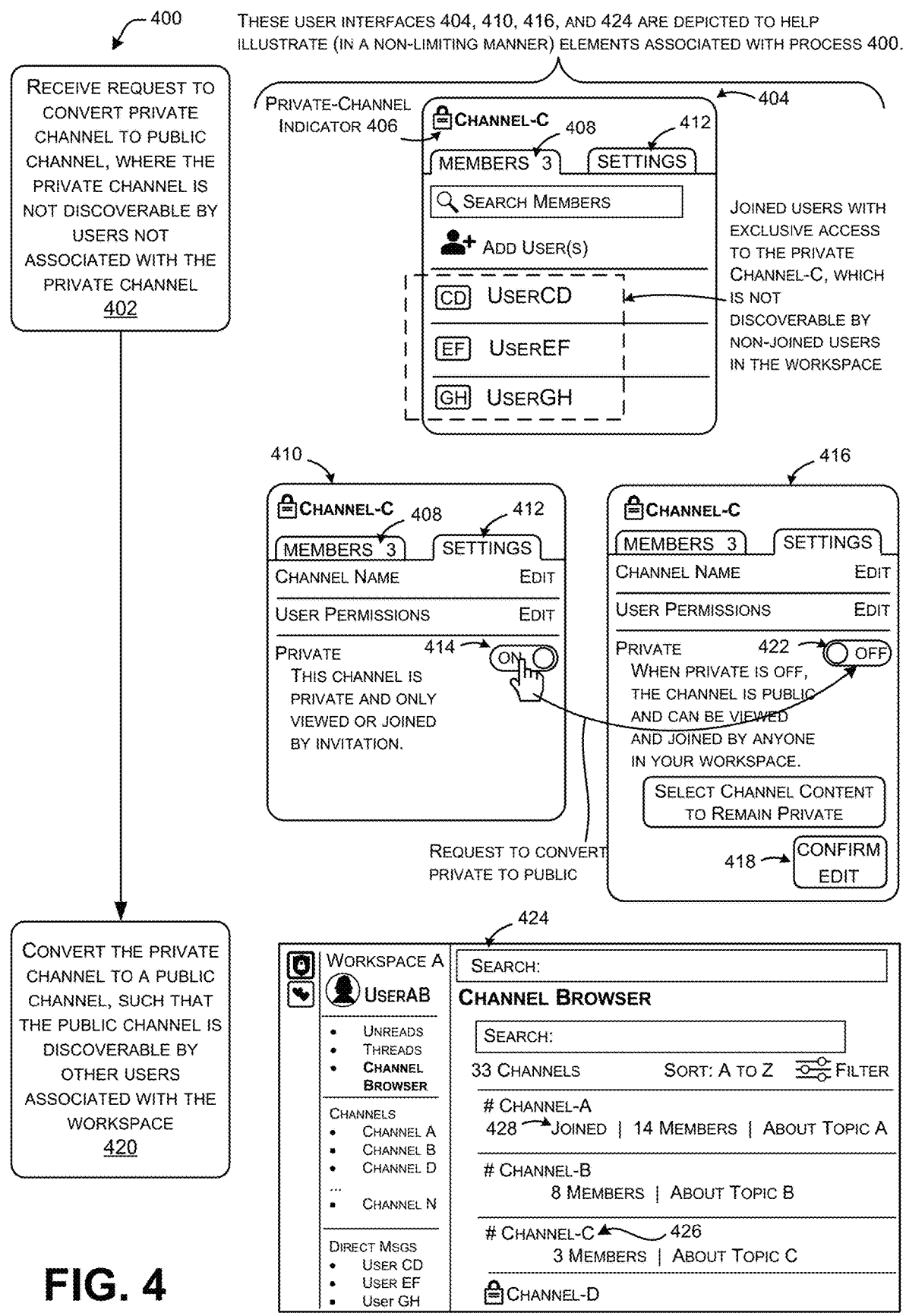
FIG. 4 includes a flow diagram illustrating an example process for converting private channels to public channels, as described herein.
Figure 5:
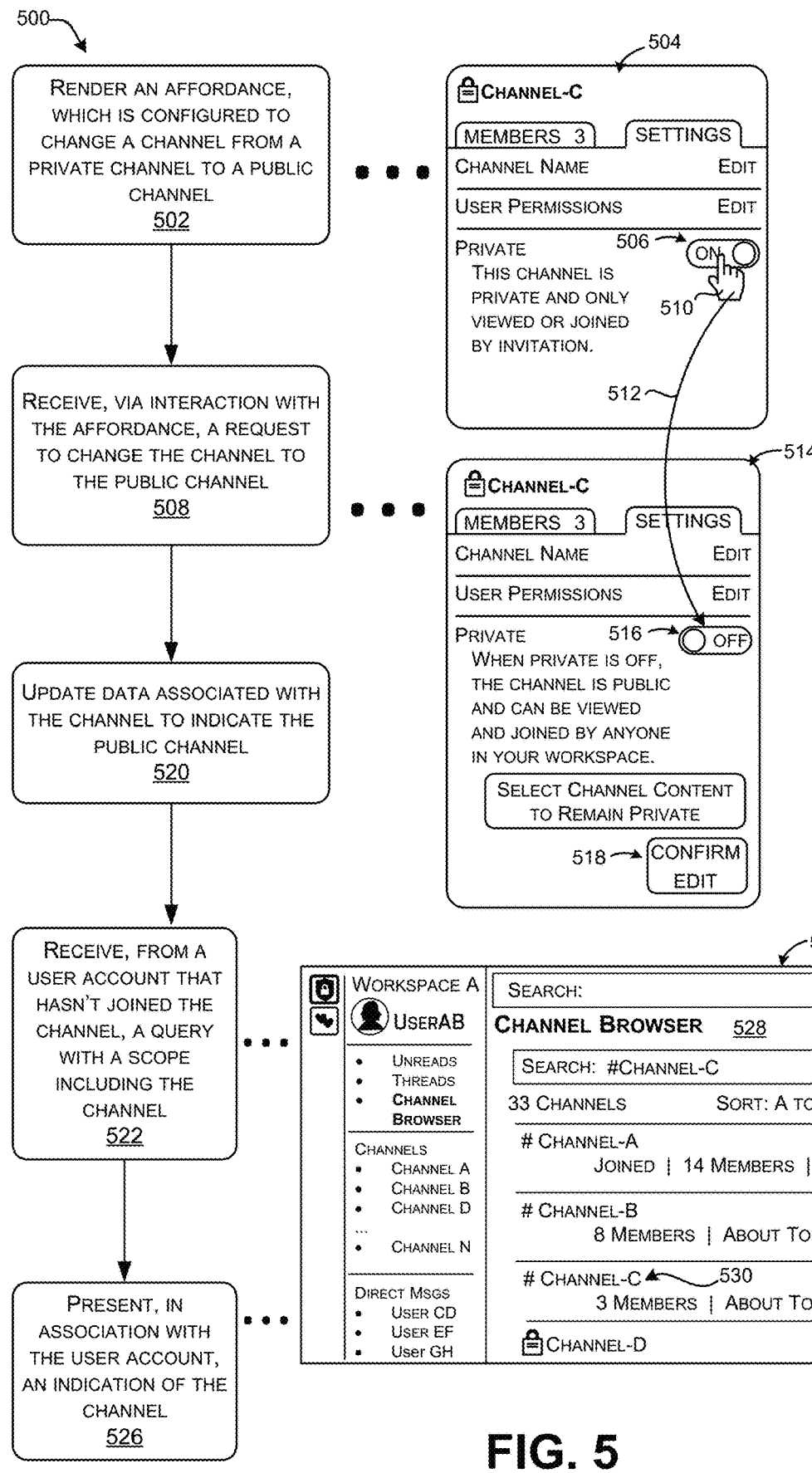
FIG. 5 includes a flow diagram illustrating an example process for converting private channels to public channels, as described herein.

Referring to FIGS. 4 and 5, example processes 400 and 500 are illustrated for changing a private channel to a public channel. In some instances, some or all of processes 400 and 500 may be performed by one or more components in the system 100 or one or more components discussed with respect to FIGS. 1, 2A, 2B, and/or 3. However, the processes 400 and 500 are not limited to being performed by components in the system 100, and the components in the system 100 are not limited to performing the processes 400 and 500 In addition, example user interfaces are also provided in FIGS. 4 and 5 to help illustrate elements, and the processes 400 and 500 are not limited to the aspects shown in the user interfaces.

Referring to FIG. 4, in at least some examples, at operation 402, the process 400 includes receiving, in association with a private channel associated with two or more users of the communication platform, a request to convert the private channel to a public channel. In addition, the private channel is associated with a first discoverability setting, such that the private channel is not discoverable by users other than the two or more users associated with the private channel or another user permissioned to access private channels associated with a workspace. For example, FIG. 4 includes user interfaces 404, 410, and 416, which may represent information associated with a private Channel-C and similar to elements of the operation 402. For instance, the user interface 404 includes information associated with the private Channel-C, in which the private nature or designation is indicated by the private-channel icon 406. In addition, the members tab 408 of the user interface 404 identifies three users that are joined to private Channel-C (e.g., to the exclusion of other non joined members in the same workspace) and can discover and view/post content to private Channel-C. In the illustrative example, the user interface 410 includes settings presented under the settings tab 412. In examples, the settings may include a private setting 414 (e.g., selectable affordance), which can provide or affect a discoverability setting. That is, designation of the privacy setting 414 can determine which user accounts can discover the Channel-C (e.g., when searching or browsing channels associated with a workspace). When the privacy setting 414 is turned on, as explained above, the private Channel-C may be discoverable by only the members of the channel (e.g., UserCD, UserEF, and UserGH that have joined the channel). For example, even though a UserAB may be a member of the same workspace as UserCD, UserEF, and User GH, UserAB may not be able to discover private Channel-C (e.g., when searching or browsing channels associated with the workspace). In a further example, the user interface 416 includes additional information that may be presented when the private setting 414 is switched (e.g., selected) and changed from "ON" to "OFF." For example, the user interface 416 presents a confirmation interface element 418. In examples, changing the private setting 414 from "ON" to "OFF" and/or the selection of the confirmation interface element 418 may represent a request to convert the Channel-C from private to public.

In at least some examples, at operation 420, the process 400 includes, based at least in part on receiving the request to convert the private channel to the public channel, modifying the first discoverability setting associated with the private channel, wherein based at least in part on the modifying, the public channel is associated with a second discoverability setting such that the public channel is discoverable by any user associated with the workspace. For example, the user interface 416 includes the private setting 422, which is illustrated to include an "OFF" designation (e.g., based on the selection of the private setting 414 and/or the confirmation interface element 418). As explained above, changing the private setting 414 from "ON" to "OFF" and/or the selection of the confirmation interface element 418 may represent a request to convert the Channel-C from private to public. In addition, the "OFF" designation or state may represent a modified discoverability setting (e.g., modified from the "ON" state). In addition, FIG. 4 includes the user interface 424, which includes a channel browser depicting a list of channels discoverable by UserAB. The list of discoverable channels includes Channel-C (as identified by the channel identifier 426), which is now discoverable by UserAB, even though UserAB has not joined Channel-C (e.g., there is no "joined" indication in association with the Channel-C channel identifier 426, in contrast to the "joined" indication 428 associated with Channel-A). The discoverability of Channel-C as it relates to UserAB may be controlled by various techniques implemented when the Channel-C is converted from private to public, such as updated tags associated with Channel-C and/or a channel search index.

Referring to FIG. 5, in at least some examples, the process 500 includes, at operation 502, causing, based on a permission setting associated with a user account, a rendering of a configurable channel setting (e.g., an affordance), which is configured to change a channel from a private channel to a public channel. For example, in FIG. 5, a user interface 504 may be presented in association with a user account, such as an administrator user account and/or a user account of one of the three members of Channel-C (e.g., that have joined Channel-C). In addition, based on a determination that the user account is associated with permission to change Channel-C from a private channel to a public channel, the configurable channel setting 506 (e.g., an affordance) may be presented, and the configurable channel setting 506 may be configured to change Channel-C from a private channel to a public channel.

In some examples, at operation 508, the process 500 includes receiving, based on an interaction with the configurable channel setting (e.g., interaction with the affordance), a request to change the channel to the public channel. For example, the hand icon 510 indicates a selection of the configurable channel setting 506, which may transition 512 the user interface 504 to another user interface 514, which provides additional information associated with the request. For example, the user interface 514 may indicate, via a modified configurable channel setting 516, that the configurable channel setting 506 was selected, which may represent a request to change Channel-C from a private channel to a public channel. In addition, the user interface 514 may include a confirmation interface element 518 that, when selected, submits a request to change Channel-C from a private channel to a public channel.

In examples, at operation 520, the process 500 includes updating, from first data to second data and based on the request, data that is associated with the channel, wherein the first data indicates the channel includes the private channel and the second data indicates the channel includes the public channel. For example, tags and/or a channel search index (e.g., as maintained by the server(s) 102) associated with the Channel-C may be changed from first data indicating Channel-C is private to second data indicating Channel-C is a public channel.

At operation 522, the process 500 may include, in some examples, receiving, from a user account not joined to the channel, a query having a scope including the channel. For example, FIG. 5 depicts the user interface 524 that is associated with user account UserAB, which includes a user account that has not joined Channel-C. Via the user interface 524 a query may be submitted (e.g., via searching and/or browsing) with a scope that includes Workspace A (e.g., any channel UserAB has access to in Workspace A).

The process 500 includes, at operation 526, presenting (or surfacing), based on the second data and in response to the query, an indication to the user account of the channel. For example, in the section 528 including the channel-browser interface, an indication 530 of Channel-C is presented based on information returned to the user account UserAB in response to the search.

Example Clauses

A: A method, implemented at least in part by one or more computing devices of a communication platform, the method comprising: receiving, in association with a private channel associated with two or more users of the communication platform, a request to convert the private channel to a public channel, wherein the private channel is associated with a first discoverability setting such that the private channel is not discoverable by users of a workspace other than the two or more users associated with the private channel; and based at least in part on receiving the request to convert the private channel to the public channel, modifying the first discoverability setting associated with the private channel, wherein based at least in part on the modifying, the public channel is associated with a second discoverability setting such that the public channel is discoverable by any user associated with the workspace.

B: The method of paragraph A, further comprising: receiving the request to convert the private channel to the public channel from a particular user; determining whether the particular user is associated with a permission or a role enabling the particular user to modify the first discoverability setting; and modifying the first discoverability setting based at least in part on a determination that the particular user is associated with the permission or role enabling the particular user to modify the first discoverability setting.

C: The method of either paragraph A or B, wherein the private channel, based at least in part on the first discoverability setting, is not discoverable via a search query or a channel browsing query.

D: The method of any one of paragraphs A-C, wherein the public channel, based at least in part on the second discoverability setting, is discoverable via at least one of a search query or a channel browsing query.

E: The method of any one of paragraphs A-D, wherein the private channel is associated with a first set of permissions that is different than a second set of permissions with which the public channel is associated, and wherein the first set of permissions are more restrictive than the second set of permissions.

F: The method of any one of paragraphs A-E, further comprising receiving an indication of a portion of data associated with the private channel to exclude from the public channel, wherein the portion of data associated with the private channel is excluded from the public channel.

G: The method of any one of paragraphs A-F, further comprising receiving an indication of a portion of data associated with the private channel to exclude from the public channel, wherein: the portion of data is included in the public channel when viewed by the two or more users associated with the private channel; and the portion of data is excluded from the public channel when viewed by other users associated with the public channel.

H: A system for implementing at least a portion of communication platform, the system comprising: one or more processors; and one or more non-transitory computer readable media storing instructions that, when executed, cause the system to: receive, in association with a private channel associated with two or more users of the communication platform, a request to convert the private channel to a public channel, wherein the private channel is associated with a first discoverability setting such that the private channel is not discoverable by users of a workspace other than the two or more users associated with the private channel; and based at least in part on receiving the request to convert the private channel to the public channel, modify the first discoverability setting associated with the private channel, wherein based at least in part on the modifying, the public channel is associated with a second discoverability setting such that the public channel is discoverable by any user associated with the workspace.

I: The system of paragraph H, the instructions, when executed, further causing the system to: receive the request to convert the private channel to the public channel from a particular user; determining whether the particular user is associated with a permission or a role enabling the particular user to modify the first discoverability setting; and modifying the first discoverability setting based at least in part on a determination that the particular user is associated with the permission or role enabling the particular user to modify the first discoverability setting.

J: The system of either paragraph H or I, wherein the private channel, based at least in part on the first discoverability setting, is not discoverable via a search query or a channel browsing query; and the public channel, based at least in part on the second discoverability setting, is discoverable via at least one of the search query or the channel browsing query.

K: The system of any one of paragraphs H-J, wherein: the private channel is associated with a first set of permissions that is different than a second set of permissions with which the public channel is associated; the first set of permissions are more restrictive than the second set of permissions.

L: The system of any one of paragraphs H-K, the instructions, when executed, further causing the system to receive an indication of a portion of data associated with the private channel to exclude from the public channel, wherein the portion of data associated with the private channel is excluded from the public channel.

M: The system of any one of paragraphs H-L, the instructions, when executed, further causing the system to receive an indication of a portion of data associated with the private channel to exclude from the public channel, wherein: the portion of data is included in the public channel when viewed by the two or more users associated with the private channel; and the portion of data is excluded from the public channel when viewed by other users associated with the public channel.

N: One or more non-transitory computer readable media storing instructions that, when executed, cause one or more processors to: receive, in association with a private channel associated with two or more users of a communication platform, a request to convert the private channel to a public channel, wherein the private channel is associated with a first discoverability setting such that the private channel is not discoverable by users of a workspace other than the two or more users associated with the private channel; and based at least in part on receiving the request to convert the private channel to the public channel, modify the first discoverability setting associated with the private channel, wherein based at least in part on the modifying, the public channel is associated with a second discoverability setting such that the public channel is discoverable by any user associated with the workspace.

O: The one or more non-transitory computer readable media of paragraph N, the instructions, when executed, further causing the one or more processors to: receive the request to convert the private channel to the public channel from a particular user; determining whether the particular user is associated with a permission or a role enabling the particular user to modify the first discoverability setting; and modifying the first discoverability setting based at least in part on a determination that the particular user is associated with the permission or role enabling the particular user to modify the first discoverability setting.

P: The one or more non-transitory computer readable media of either paragraph N or O, wherein the private channel, based at least in part on the first discoverability setting, is not discoverable via a search query or a channel browsing query.

Q: The one or more non-transitory computer readable media of any one of paragraphs N-P, wherein the public channel, based at least in part on the second discoverability setting, is discoverable via at least one of a search query or a channel browsing query.

R: The one or more non-transitory computer readable media of any one of paragraphs N-Q, wherein: the private channel is associated with a first set of permissions that is different than a second set of permissions with which the public channel is associated; the first set of permissions are more restrictive than the second set of permissions.

S: The one or more non-transitory computer readable media of any one of paragraphs N-R, the instructions, when executed, further causing the one or more processors to receive an indication of a portion of data associated with the private channel to exclude from the public channel, wherein the portion of data associated with the private channel is excluded from the public channel.

T: The one or more non-transitory computer readable media of any one of paragraphs N-S, the instructions, when executed, further causing the one or more processors to receive an indication of a portion of data associated with the private channel to exclude from the public channel, wherein: the portion of data is included in the public channel when viewed by the two or more users associated with the private channel; and the portion of data is excluded from the public channel when viewed by other users associated with the public channel.

U: The one or more non-transitory computer readable media of any one of paragraphs N-T, the instructions, when executed, further causing the one or more processors to: based at least in part on a user being associated with the private channel, causing a rendering of an affordance on a user interface associated with the private channel, wherein the request to convert the private channel to the public channel is received based on an interaction by the user with the affordance.

While the example clauses described above are described with respect to one particular implementation, it should be understood that, in the context of this document, the content of the example clauses may also be implemented via a method, device, system, a computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:

receiving, in association with a private channel associated with two or more users of the communication platform, a request to convert the private channel to a public channel, wherein the private channel is associated with a first discoverability setting such that the private channel is not discoverable by users of a workspace other than the two or more users associated with the private channel;

initiating, based at least in part on receiving the request to convert the private channel to the public channel, an approval workflow that provides, to the two or more users, at least one of a first option to approve or oppose conversion of the private channel to the public channel or a second option to identify content within the private channel that is to be unviewable by the users of the workspace; and based at least in part on receiving the request to convert the private channel to the public channel and the approval workflow, modifying the first discoverability setting associated with the private channel, wherein based at least in part on the modifying of the first discoverability setting, the public channel is associated with a second discoverability setting such that the public channel is discoverable by any user associated with the workspace.

2. The method of claim 1, further comprising:

receiving the request to convert the private channel to the public channel from a particular user;

determining whether the particular user is associated with a permission or a role enabling the particular user to modify the first discoverability setting; and modifying the first discoverability setting based at least in part on a determination that the particular user is associated with the permission or role enabling the particular user to modify the first discoverability setting.

3. The method of claim 1, wherein the private channel, based at least in part on the first discoverability setting, is not discoverable via a search query or a channel browsing query.

4. The method of claim 1, wherein the public channel, based at least in part on the second discoverability setting, is discoverable via at least one of a search query or a channel browsing query.

5. The method of claim 1, further comprising:

obscuring from view, within the public channel and with respect to the users of the workspace, second content posted within the private channel prior to the private channel being converted to the public channel such that the second content is only viewable by the two or more users; and causing display, to the two or more users and the users of the workspace, of third content posted to the public channel after the private channel has been converted to the public channel.

6. The method of claim 1, further comprising receiving an indication of a portion of data associated with the private channel to exclude from the public channel, wherein the portion of data associated with the private channel is excluded from the public channel.

7. The method of claim 1, further comprising receiving an indication of a portion of data associated with the private channel to exclude from the public channel, wherein:
the portion of data is included in the public channel when viewed by the two or more users associated with the private channel; and
the portion of data is excluded from the public channel when viewed by other users associated with the public channel.

8. A system for implementing at least a portion of communication platform, the system comprising:
one or more processors; and
one or more non-transitory computer readable media storing instructions that, when executed, cause the system to:
receive, in association with a private channel associated with two or more users of the communication platform, a request to convert the private channel to a public channel, wherein the private channel is associated with a first discoverability setting such that the private channel is not discoverable by users of a workspace other than the two or more users associated with the private channel;
initiate, based at least in part on receiving the request to convert the private channel to the public channel, an approval workflow that provides, to the two or more users, at least one of a first option to approve or oppose conversion of the private channel to the public channel or a second option to identify content within the private channel that is to be unviewable by the users of the workspace; and
based at least in part on receiving the request to convert the private channel to the public channel and the approval workflow, modify the first discoverability setting associated with the private channel, wherein based at least in part on the modifying of the first discoverability setting, the public channel is associated with a second discoverability setting such that the public channel is discoverable by any user associated with the communication platform.

9. The system of claim 8, the instructions, when executed, further causing the system to:
receive the request to convert the private channel to the public channel from a particular user;
determining whether the particular user is associated with a permission or a role enabling the particular user to modify the first discoverability setting; and
modifying the first discoverability setting based at least in part on a determination that the particular user is associated with the permission or role enabling the particular user to modify the first discoverability setting.

10. The system of claim 8, wherein
the private channel, based at least in part on the first discoverability setting, is not discoverable via a search query or a channel browsing query; and
the public channel, based at least in part on the second discoverability setting, is discoverable via at least one of the search query or the channel browsing query.

11. The system of claim 8, wherein:
the private channel is associated with a first set of permissions that is different than a second set of permissions with which the public channel is associated;
the first set of permissions are more restrictive than the second set of permissions.

12. The system of claim 8, the instructions, when executed, further causing the system to receive an indication of a portion of data associated with the private channel to exclude from the public channel, wherein the portion of data associated with the private channel is excluded from the public channel.

13. The system of claim 8, the instructions, when executed, further causing the system to receive an indication of a portion of data associated with the private channel to exclude from the public channel, wherein:
the portion of data is included in the public channel when viewed by the two or more users associated with the private channel; and
the portion of data is excluded from the public channel when viewed by other users associated with the public channel.

14. One or more non-transitory computer readable media storing instructions that, when executed, cause one or more processors to:
receive, in association with a private channel associated with two or more users of a communication platform, a request to convert the private channel to a public channel, wherein the private channel is associated with a first discoverability setting such that the private channel is not discoverable by users of a workspace other than the two or more users associated with the private channel;
initiate, based at least in part on receiving the request to convert the private channel to the public channel, an approval workflow that provides, to the two or more users, at least one of a first option to approve or oppose conversion of the private channel to the public channel or a second option to identify content within the private channel that is to be unviewable by the users of the workspace; and
based at least in part on receiving the request to convert the private channel to the public channel, modify the first discoverability setting associated with the private channel, wherein based at least in part on the modifying of the first discoverability setting, the public channel is associated with a second discoverability setting such that the public channel is discoverable by any user associated with the workspace.

15. The one or more non-transitory computer readable media of claim 14, the instructions, when executed, further causing the one or more processors to:
receive the request to convert the private channel to the public channel from a particular user;
determining whether the particular user is associated with a permission or a role enabling the particular user to modify the first discoverability setting; and
modifying the first discoverability setting based at least in part on a determination that the particular user is associated with the permission or role enabling the particular user to modify the first discoverability setting.

16. The one or more non-transitory computer readable media of claim 14, wherein the private channel, based at least in part on the first discoverability setting, is not discoverable via a search query or a channel browsing query.

17. The one or more non-transitory computer readable media of claim 14, wherein the public channel, based at least in part on the second discoverability setting, is discoverable via at least one of a search query or a channel browsing query.

18. The one or more non-transitory computer readable media of claim 14, wherein:
- the private channel is associated with a first set of permissions that is different than a second set of permissions with which the public channel is associated;
- the first set of permissions are more restrictive than the second set of permissions.

19. The one or more non-transitory computer readable media of claim 14, the instructions, when executed, further causing the one or more processors to receive an indication of a portion of data associated with the private channel to exclude from the public channel, wherein the portion of data associated with the private channel is excluded from the public channel.

20. The one or more non-transitory computer readable media of claim 14, the instructions, when executed, further causing the one or more processors to receive an indication of a portion of data associated with the private channel to exclude from the public channel, wherein:
- the portion of data is included in the public channel when viewed by the two or more users associated with the private channel; and
- the portion of data is excluded from the public channel when viewed by other users associated with the public channel.

* * * * *